Feb. 12, 1963   W. E. HEINZ ETAL   3,077,500
ALDOL CONDENSATION REACTIONS
Filed June 23, 1955   2 Sheets-Sheet 1

INVENTORS
WALTER E. HEINZ
ALEXANDER F. MACLEAN
BY
ATTORNEYS.

United States Patent Office 3,077,500
Patented Feb. 12, 1963

3,077,500
ALDOL CONDENSATION REACTIONS
Walter E. Heinz and Alexander F. MacLean, Corpus Christi, Tex., assignors to Celanese Corporation of America, New York, N.Y., a corporation of Delaware
Filed June 23, 1955, Ser. No. 517,606
20 Claims. (Cl. 260—594)

This application is a continuation-in-part of our copending application Serial No. 424,412, filed April 20, 1954, now abandoned.

This invention relates to a condensation process, and relates more particularly to the production of ethylenically unsaturated carbonyl compounds.

The aldol condensation is well known in the art. Most commonly, this condensation is employed for the reaction of an aldehyde, in alkaline medium, with a compound carrying an activated hydrogen atom, e.g. with itself, with another aldehyde, with a ketone such as methyl ethyl ketone or acetone, or with a nitroparaffin such as nitromethane or nitroethane, to produce a compound containing an alcoholic hydroxyl group. It is also well known to subject the resulting hydroxyl compound to a dehydration reaction to produce an unsaturated compound. For example, methyl isopropenyl ketone has been obtained by a two-step reaction in which formaldehyde is condensed with methyl ethyl ketone to produce 4-hydroxy-3-methyl butanone-2 followed by dehydration of the latter.

It is an object of this invention to provide a novel process for carrying out an aldol condensation.

A further object of this invention is the provision of a new and efficient process for carrying out an aldol condensation in a continuous manner in the presence of a basic catalyst without substantially contaminating the products by the catalyst.

Another object of this invention is to provide a novel process for carrying out an aldol condensation in the presence of an anion exchange resin wherein the catalytic effectiveness of said resin is maintained for long periods of time.

Still another object of this invention is the provision of a new and economical process for making methyl isopropenyl ketone from formaldehyde and methyl ethyl ketone.

An additional object of this invention is to provide a new and economical process for the aldol autocondensation of aldehydes such as acetaldehyde or butyraldehyde.

Other objects of this invention will be apparent from the following detailed description and claims.

In the following detailed description and claims the term "reactants" is used to designate not only a plurality of different reactants, e.g. formaldehyde and methyl ethyl ketone, but also a plurality of molecules of a single material which undergoes autocondensation, under the conditions of the reaction, e.g. butyraldehyde, unless otherwise specified.

According to one aspect of this invention an aldol condensation is carried out by passing a liquid containing the reactants through a catalyst comprising a bed of an alkaline anion-exchange resin, which bed is arranged to receive liquid from a reflux condenser and to deliver it to a fractional distillation zone, e.g. a distillation column. The liquid containing the reactants, after passing through the bed of resin, flows down the distillation column where it is rectified. Any unreacted reactants are vaporized in the distillation column and flow upward to the condenser where they are reliquefied and from which they flow, as reflux, together with added amounts of reactants through the bed of anion-exchange resin.

During the process the liquid mixture in contact with the anion-exchange resin is maintained at a temperature sufficient to cause the formation of the desired aldol condensation product. The resulting liquid reaction mixture comprising this aldol condensation product in admixture with at least one unreacted reactant flows downwardly through the distillation column countercurrent to the ascending vapors of said unreacted reactant. Thus the descending liquid is rectified so that the concentration of the aldol condensation product, which is less volatile than said reactant, becomes progressively higher as the liquid proceeds down the column. The liquid withdrawn from the bottom of the distillation column therefore contains a relatively high concentration of said aldol condensation product and little, if any, of the reactants.

An important feature of this invention relates to the use of a tertiary amine in the reaction mixture. It has been found particularly desirable to employe a tertiary amine whose volatility is similar to that of one of the reactants so that the amine evaporates in the distillation column and is liquefied in the condenser. It will be readily seen that when such an amine is used it will be present in the reaction mixture, where it has a catalytic action, but it will not appear in the reaction product. The amine may, in fact, be used as the sole catalyst for the reaction and the anion-exchange resin may be omitted when the amine is present. However, in many cases, particularly when it is necessary to operate at atmospheric pressure, best results are obtained by employing both the amine and the anion-exchange resin. It has been found, surprisingly, that the amine acts to maintain the catalytic activity of alkaline anion-exchange resins and even acts to make neutral anion-exchange resins sufficiently basic to be employed as catalyst.

Examples of aldol condensations to which the process of this invention may be applied are the condensation of formaldehyde with ketones such as acetone, methyl ethyl ketone, methyl propyl ketone, methyl butyl ketone, ethyl propyl ketone or methyl isopropenyl ketone; the condensation of formaldehyde with other aldehydes, such as acetaldehyde, butyraldehyde, isobutyraldehyde or propionaldehyde; or the condensation of formaldehyde with nitroparaffins such as nitromethane, nitropropane, 1-nitrobutane or 2-nitrobutane. The process of this invention may also be employed for carrying out the aldol autocondensation of aldehydes having at least two carbon atoms, such as acetaldehyde, propionaldehyde, butyraldehyde, valeraldehyde, and other aldehydes having alpha hydrogen atoms.

The anion-exchange resins employed in the process of this invention advantageously contain quaternary ammonium groups. One type of anion-exchange resin which is particularly effective is prepared by reacting a tertiary amine with a haloalkylated cross-linked polymer of a vinyl aromatic compound, such as a chloromethylated copolymer of styrene and divinyl benzene, as described in McBurney, U.S. Patent No. 2,591,573. Other anion-exchange resins which may be employed are products obtained by reacting methyl chloride, dimethyl sulfate or other alkylating agent with amine-containing resins, e.g. with resins obtained by the reaction of formaldehyde, aniline and ethylene diamine. Weakly basic anion-exchange resins containing tertiary amine groups, such as resins obtained by reacting a secondary amine, e.g. diethyl amine, with a chloromethylated copolymer of styrene and divinyl benzene may also be used.

The process of this invention may advantageously be employed for the continuous preparation of ethylenically unsaturated compounds, such as methyl isopropenyl ketone, vinyl isopropenyl ketone, methyl vinyl ketone, crotonaldehyde or 2-ethyl-2-hexenal. For example, the monohydroxy compound produced by the aldol reaction may be withdrawn continuously from the base of the distillation column and then continuously dehydrated in the presence of a dehydration catalyst to form the desired unsaturated compound.

Several embodiments of this invention are illustrated in the accompanying drawing wherein.

Referring now to the drawings, reference numeral 11 (FIG. 1) indicates a distillation column, which may be of any desired type. This distillation column 11 is used for separating the reactants from the aldol condensation product and is therefore hereinafter termed an "aldol distillation column." At the bottom of this aldol distillation column 11 there is provided a thermosiphon reboiler 12, which serves to heat the liquid at the bottom of said column to the boiling point. Above the aldol distillation column there is a catalyst container 13 and a reflux condenser 14. The condenser 14 is so designed that the vapors being condensed flow in the same direction as the condensate.

Figure 1:
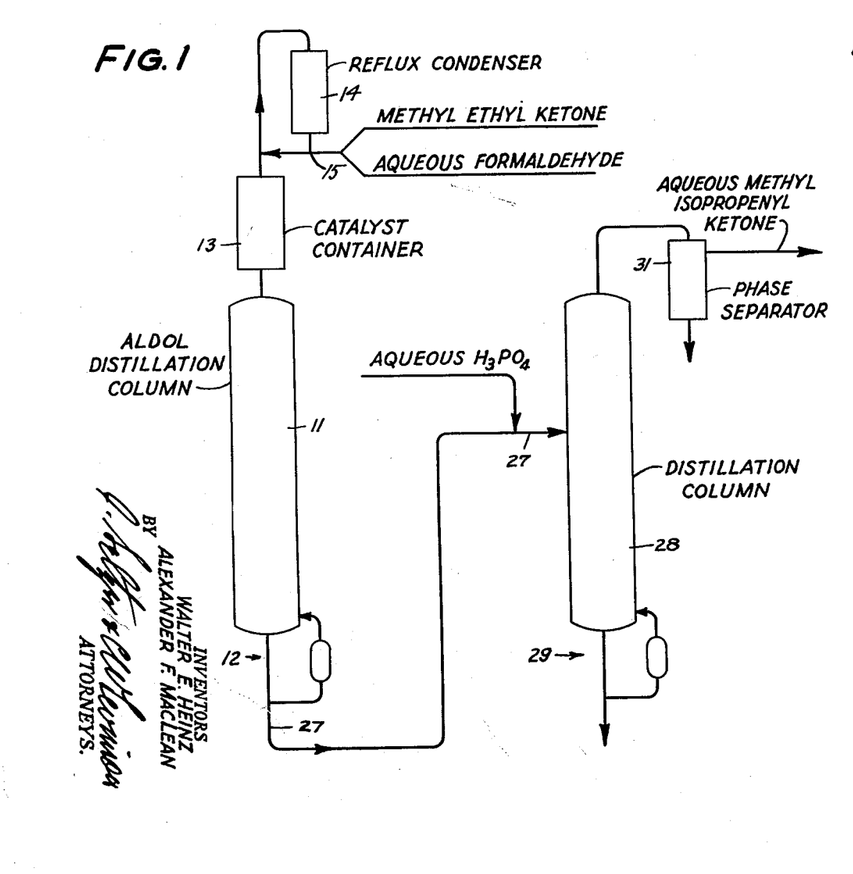
FIG. 1 is a flow diagram illustrating the application of this invention to the continuous reaction of methyl ethyl ketone and formaldehyde to produce methyl isopropenyl ketone.

The condensate draining from the condenser 14 is mixed at an inlet 15 with a continuous stream of the reactants, e.g. methyl ethyl ketone and aqueous formaldehyde, and the resulting mixture flows through an opening 16 (FIG. 2) to the catalyst container 13 and then through a lower opening 17 of said container to the aldol distillation column 11. Within the container 13 there is a tube 18, closed at its lower end, for supporting a bed 19 of a granular anion-exchange resin.

Figure 2:
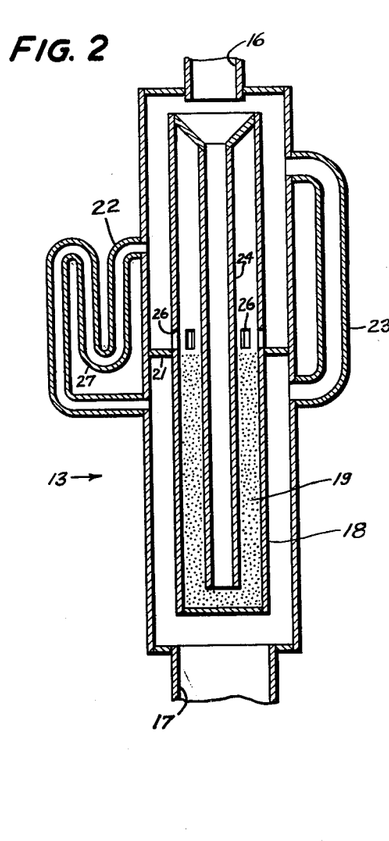
FIG. 2 is a cross-sectional view, in elevation, of a container for holding the bed of anion-exchange resin used in this invention.

The construction and arrangement of the container 13 is such that liquid draining from the condenser 14 through opening 16 flows through the bed 19 and then out through the opening 17 to the aldol distillation column 11, while vapors arising from said column 11 flow upward through the opening 17, by-pass the bed 19, and then flow out through the opening 16 to the condenser 14. To accomplish this the container 13 is divided into two compartments by an annular partition 21, surrounding the tube 18, these two compartments of the container 13 being connected by an overflow pipe 22 and a by-pass 23. There is also provided in the container 13 a central conduit 24 concentric with and extending into the tube 18. Liquid draining through opening 16 accumulates in the central conduit 24, flows through the bed 19 and through apertures 26 located above the partition 21, and overflows through pipe 22, to the lower half of the container 13, from which it drains through opening 17. Vapors rising through opening 17 flow through the by-pass 23 to the upper opening 16. These vapors do not flow through the overflow pipe 22 because the latter is provided with a U-shaped trap section 27 for the accumulation of liquid which acts as a seal. Similarly, no liquid flows through the by-pass 23 since the level of the upper opening of the overflow pipe 22 is below the level of the upper opening of said by-pass.

At the start of operation a mixture of methyl ethyl ketone, water and a small amount of a volatile tertiary amine e.g. triethylamine, is refluxed in the apparatus. An azeotrope of these three materials, boiling at 72.8° C., is liquefied in the condenser and passes through the bed 19 of anion-exchange resin. The reboiler 12 and the lower portion of the aldol distillation column 11 are maintained substantially free of methyl ethyl ketone by maintaining the temperature in the lower portion of the column considerably above the boiling point of methyl ethyl ketone, e.g. by regulating the input of heat to the reboiler 12 and the amount of methyl ethyl ketone present in the column 11. The feed mixture of nearly equimolecular proportions of methyl ethyl ketone and aqueous formaldehyde is metered continuously into the inlet 15 at such a rate that the amount of methyl ethyl ketone in the liquid reaction mixture flowing to the bed 19 of anion-exchange resin is greater than the amount of formaldehyde in such liquid reaction mixture, on a molar basis.

As shown in FIG. 2, the bed 19 of anion-exchange resin is supported in heat-exchange relationship, but out of direct contact, with the stream of vapors flowing upwardly from the aldol distillation column 11. Accordingly, the bed of ion-exchange resin is heated by this vapor stream and is maintained at the maximum practical operating temperature, i.e. a temperature which is at or near the boiling point of the components of the vapor stream at the pressure prevailing in the reaction system. This operating temperature, which causes the reaction to proceed at the maximum practical rate, is maintained inherently without the use of any separate control system. In this connection, it is desirable that the vapor stream be cooled in the condenser 14 only to the extent necessary to liquefy said vapor stream. That is, the condensate should have a temperature which is at or near its boiling point so that the temperature of the liquid reaction mixture flowing to the bed 19 is close to (e.g. within 5° C. of) the temperature of the stream of vapors flowing upwardly from the aldol distillation column. When such a temperature relationship is maintained the exchange of heat between said vapors and said liquid reaction mixture, and the consequent early condensation of a portion of said vapors, is minimized. Accordingly, more of the upwardly flowing vapors reach the reflux condenser 14 and, as a result, the reactants are recycled through the bed 19 of resin at a greater rate.

The liquid reaction mixture flows upwardly through the heated bed 19 of anion-exchange resin. This upward flow facilitates the escape of any vapors which may be generated in the bed of resin because of the heat of reaction or other factors.

After it leaves the container 13 the mixture flows down through the aldol distillation column 11 where the volatile unreacted constituents thereof are vaporized. A stream of a liquid comprising the aldol condensation product, i.e. 4-hydroxy-3-methyl butanone-2, and water is discharged continuously from the reboiler 12, which reboiler has a constant level take-off by means of which it discharges any liquid which accumulates above a predetermined level therein. The stream of liquid from the reboiler 12 flows through a conduit 27, where it is combined continuously with aqueous phosphoric acid, or other suitable dehydration catalyst, and the resulting mixture is introduced into the intermediate portion of a second packed distillation column 28. Heat is supplied to the column 28 by a thermosiphon reboiler 29. The distillate from the column 28 is condensed, a portion of the condensate being returned to the column 28 as reflux and the remainder being fed to a phase separator 31, where it separates into two phases: a lower water phase which contains any unreacted formaldehyde and an upper phase comprising methyl isopropenyl ketone and a small amount of water. From the reboiler 29 a continuous stream of aqueous phosphoric acid is withdrawn, which stream may be recirculated to the conduit 27 in place of fresh phosphoric acid, if desired.

As previously stated, the reflux condenser 14 is so designed that the vapors being condensed flow in the same direction as the condensate. If a condenser in which the vapors and condensate flow in a countercurrent manner were used, the formaldehyde, which is the lowest boiling component in the system, would remain in the uncondensed vapors until after the higher boiling constituents of the vapors had condensed. The resulting formaldehyde-rich vapors would tend to precipitate as paraformaldehyde on the cold walls of the condenser.

The use of the concurrent type of condenser prevents the precipitation of formaldehyde as paraformaldehyde and retains the formaldehyde in the stream of condensate.

Figures 3, 4:
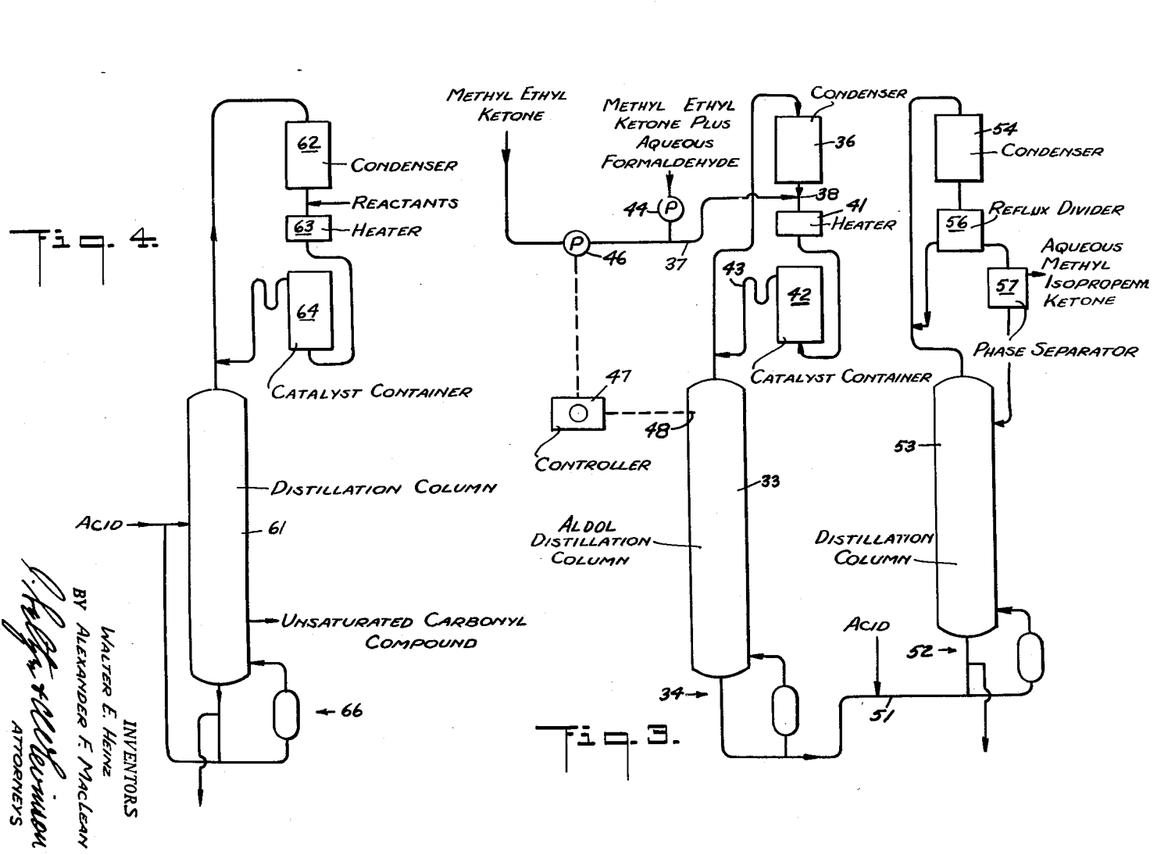
FIG. 3 is a flow diagram showing another embodiment of this invention.
FIG. 4 is a flow diagram showing still another form of this invention.

The embodiment of this invention illustrated in FIG. 3 employs an aldol distillation column 33, a thermosiphon reboiler 34 and a reflux condenser 36 substantially identical with the aldol distillation column 11, reboiler 12 and reflux condenser 14, respectively, of the embodiment shown in FIG. 1, discussed above. However, the vapors arising from the column 33 pass directly to the reflux condenser 36. The condensed vapors, comprising water, methyl ethyl ketone, formaldehyde and a tertiary amine, e.g. triethylamine, are then blended with a feed mixture of methyl ethyl ketone and aqueous formaldehyde, supplied through a line 37 to an inlet 38. The resulting liquid reaction mixture is passed first through a heater 41 where its temperature is raised to about 73° C. and then upwardly through a bed of anion-exchange resin catalyst disposed in a container 42. From the top of the container 42 the mixture passes, through a trap 43, to the top of the distillation column 33. The heat supply to the reboiler 34 is such that refluxing through the condenser 36 takes place at a substantially constant rate. The feed mixture is supplied through the line 37 at such a rate that the molar ratio of methyl ethyl ketone to formaldehyde in the liquid reaction mixture flowing to the heater 41 is high, e.g. about 30:1.

The relative proportions of the reactants in the feed mixture supplied through line 37 are regulated by a control mechanism which is responsive to variations in the composition of the contents of the aldol distillation column 33. To this end there is provided a pump 44, operating at constant speed, for continuously supplying to line 37 a mixture of one mole of methyl ethyl ketone and more than one mole, e.g. 1.1 mole, of aqueous formaldehyde. There is also provided a pump 46 operable at a variable rate for supplying methyl ethyl ketone to said line 37. The speed of the pump 46 is regulated by an indicating and recording controller 47, of conventional construction, connected to a suitable temperature-sensing element, such as a thermocouple 48, mounted at a predetermined point in the distillation column 33.

The temperature indicated by the thermocouple 48 provides an indication of the composition of the material in the column 33 at the predetermined point where said thermocouple is located. Thus a decrease in the temperature measured by the thermocouple 48 indicates an increase in the methyl ethyl ketone content at said predetermined point and vice versa. The controller 47 is preset to maintain a temperature at said predetermined point such that substantially no unreacted methyl ethyl ketone will pass down the column 33 to the reboiler 34. For example, if the column 33 has about 30 trays and the thermocouple 48 is situated at the fifth tray from the top, the control temperature is advantageously about 85° C. When the temperature indicated by the thermocouple 48 is less than the control temperature, the controller 47 acts to decrease the speed of the pump 46, while when the indicated temperature is greater than the control temperature, the controller acts to increase the speed of the pump 46. By means of this arrangement the reaction may be carried out continuously under substantially constant conditions and substantially complete reaction of the methyl ethyl ketone and formaldehyde to the desired monomethylol condensation product may be attained, with a minimum of attention on the part of the operator.

The mixture of the monomethylol condensation product, i.e. 4-hydroxy-3-methyl butanone-2 and water, which overflows from the constant-level reboiler 34, passes through a line 51 where it is mixed with an acidic dehydration catalyst and then fed into a thermosiphon reboiler 52 located at the base of a distillation column 53. Due to the action of the acidic catalyst on the 4-hydroxy-3-methyl butanone-2 at the elevated temperature prevailing in the reboiler 52, methyl isopropenyl ketone is formed. The reaction mixture is fractionated in the column 53 to produce an azeotropic distillate comprising water and methyl isopropenyl ketone. If desired, the acidic reaction mixture may be passed through a separate reaction vessel (not shown) where it is kept for a suitable period of time before it is fed to the column 53. The azeotropic distillate from the column 53 is condensed in a condenser 54 and then passed to a reflux divider 56, of conventional construction. From the reflux divider 56 a portion of the distillate is returned to the column 53 as a reflux, and the remainder is passed into a phase separator 57, where it separates into two phases: an upper phase comprising methyl isopropenyl ketone and a small amount of water and a lower aqueous phase. The upper phase is recovered and then dried if desired, while the lower phase is returned to an intermediate point on the column 53. From the base of the column 53 a mixture comprising water and the acidic catalyst is withdrawn.

The reflux divider 56 serves to return a sufficient amount of the non-aqueous phase of the condensate to the top of the clumn 53 so as to maintain the temperature at the top of the said clumn at substantially the boiling point of the azeotrope of methyl isopropenyl ketone and water. This prevents any higher boiling organic components in the system from appearing in the distillate and contaminating the methyl isopropenyl ketone. Desirably the reflux divider 56 is of the variable type so that it may be set to divert just enough of the condensate to the column to insure the maintenance of the desired temperature.

It is to be understood that while the processes and apparatus illustrated in FIGS. 1, 2 and 3 have been described with particular reference to the condensation of methyl ethyl ketone and formaldehyde, such processes and apparatus are applicable to aldol condensations generally.

In FIG. 4 there is shown an embodiment of the invention in which the two distillation columns used in each of FIGS. 1 and 3 are combined into a single distillation column 61. In the upper portion of this column 61 the reactants and the tertiary amine are volatilized and thus separated from the aldol condensation product in the same manner as in the aldol distillation columns 11 and 33 of FIGS. 1 and 3, respectively. The distillate from the column 61 is condensed in the reflux condenser 62, mixed with fresh reactants, heated to the desired reaction temperature in the heater 63, passed through the bed of anion-exchange resin in the container 64 and then returned to the top of the column 61. The aldol condensation product passes down the column 61 and is brought into contact with the acidic dehydration catalyst which is fed in at an intermediate point on said column. Under the influence of the catalyst the dehydration reaction takes place in the lower portion of the column 61. A stream comprising the unsaturated carbonyl compound, in the vapor state, is withdrawn from a point in the lower portion of the column 61. Heat is supplied to the column 61 by a thermosiphon reboiler 66. Aa portion of the acidic stream circulating through the reboiler 66 is withdrawn and another portion of this stream is recycled by mixing it with the fresh acid being fed to the column. This apparatus is particularly suitable in cases where there is a large difference in boiling points between the reactants and the unsaturated products. For example, it may advantageously be employed for reactions in which the aldehyde reactant has at least two carbon atoms, such as the autocondensation of acetaldehyde to produce crotonaldehyde or the autocondensation of butyraldehyde to produce 2-ethyl-hexenal.

While upward flow of the reactants through the bed of anion exchange resin is shown in the drawings, it is found that downward flow is sometimes more advantageous. Thus, when the bed of resin is relatively deep, e.g. two or more feet deep, it is found that production is more uniform, with less channeling of the reactants through the bed, when the reactants flow downward through the bed.

The following examples are given to illustrate this invention further.

Example I

A reaction between methyl ethyl ketone and formaldehyde is carried out in the apparatus illustrated in FIGS. 1 and 2. The anion-exchange resin employed is a granular material containing quaternary ammonium chloride groups, specifically the resin disclosed in McBurney, U.S. Patent No. 2,591,573, and sold under the name "Amberlite IRA–400." This resin is in the form of uniform, attrition-resistant, bead-like particles in a moist, completely swollen condition, having a moisture content of 40 to 50% and an apparent density of about 40 pounds per cubic foot. The screen grading of the resin particles (wet) is 20 to 50 mesh (U.S. standard screen) and their effective size is 0.35 to 0.45 millimeter. The "Amberlite IRA–400," which is herein used in its chloride salt form, is characterized by a total exchange capacity, when completely regenerated to its hydroxy form, of about 22 kilograins (as calcium carbonate) per cubic foot.

To start the operation the catalyst container, holding the bed of resin, is filled, to the upper level of its overflow pipe, with methyl ethyl ketone, and the thermosiphon reboiler is filled with water, which is brought to a boil in said reboiler. Methyl ethyl ketone is then added to the aldol distillation column, and the system is brought to strong reflux with said column operating just below its flood-point. The amount of methyl ethyl ketone added is such that the temperature of the aldol distillation column, at a point spaced above the base of the column a distance equal to about ⅕ the height of the column, is 85° C. During the refluxing operation an azeotrope of water and methyl ethyl ketone, boiling at 73.4° C., is liquefied in the condenser and passes over the bed of anion-exchange resin. To the liquefied azeotrope flowing to the bed of resin there is added gradually a quantity of triethylamine sufficient to provide a concentration of triethylamine of 2.5% by weight in the mixture passing to said bed. The mixture of methyl ethyl ketone, water and triethylamine is refluxed for one hour, following which a liquid mixture of methyl ethyl ketone and a 40% by weight aqueous solution of formaldehyde, in which mixture the molar ratio of methyl ethyl ketone to formaldehyde is about 1:1.09, is metered continuously into the condensate flowing to the bed of resin at a rate sufficient to provide a molar ratio of methyl ethyl ketone to formaldehyde of about 30:1 in the resulting liquid reaction mixture. The temperature in the bed of anion-exchange resin is about 72.8° C., which is the boiling point of the azeotrope of methyl ethyl ketone, water and triethylamine. During the continuous addition of the mixture of aqueous formaldehyde and methyl ethyl ketone, the concentration of triethylamine in the liquid flowing to the bed of resin is maintained at 2.5% by weight by the addition thereto of further triethylamine as needed. The pH of the liquid leaving the bed of resin is 10.4, as measured by means of a glass-calomel cell permanently mounted in the path of said liquid and connected to a Beckman Model H–2 pH meter. The temperature in the reboiler of the aldol distillation column is maintained at 105° C., while the temperature at a point about ⅕ of the distance up said column is about 85° C. so that said reboiler is substantially free of methyl ethyl ketone. The stream of liquid comprising 4-hydroxy-3-methyl butanone-2 and water, which is discharged continuously from this reboiler, is combined continuously with one half its volume of 85% phosphoric acid, and the resulting mixture is introduced into the second distillation column, at about the midpoint of said column.

The reboiler for the second distillation column is maintained at a temperature of 105° C. Vapors of an azeotrope of methyl isopropenyl ketone are removed continuously from the top of the second column at a temperature of 81 to 82° C., at atmospheric pressure. This azeotrope is condensed and ⅔ of the condensate is returned to the top of said second column as reflux. The remaining ⅓ of the condensate is allowed to separate into two phases: a lower water phase which contains any unreacted formaldehyde and an upper phase comprising 96.6% of methyl isopropenyl ketone and about 2.7% of water. The residence time of the material in the second distillation column is about 60 minutes. From the reboiler of this second column a continuous stream of aqueous phosphoric acid is withdrawn. For each 23.8 moles of formaldehyde and 21.8 moles of methyl ethyl ketone fed into the system there are obtained 20.2 moles of a mixture of isomers comprising 95% of methyl isopropenyl ketone and 5% by weight of ethyl vinyl ketone, representing a conversion of formaldehyde to methyl isopropenyl ketone and ethyl vinyl ketone of 84.9% and of methyl ethyl ketone to methyl isopropenyl ketone and ethyl vinyl ketone of 92.7%, the efficiency of conversion to methyl isopropenyl ketone and ethyl vinyl ketone being 90.5%, based on the formaldehyde, and 92.7%, based on methyl ethyl ketone. The rate of production of the methyl isopropenyl ketone and ethyl vinyl ketone is about 0.0038 gram mole per milliliter of anion-exchange resin bed per hour; this rate remains substantially constant throughout the run. It is found that the triethylamine is used up at the rate of about 1 mole for each 550 moles of methyl isopropenyl ketone and its isomer produced.

Example II

The procedure described in Example I is repeated with the following exceptions:

The anion-exchange resin used is a material prepared by treating the "Amberlite IRA–400" resin, which is the chloride salt form, with a 2% aqueous sodium carbonate solution having a pH of 11.1 and then washing the resin. More specifically, the treatment is carried out by filling a column, whose length is 10 times its diameter, with the "Amberlite IRA–400" resin and passing the 2% aqueous sodium carbonate solution upward through said resin at a rate of 5 ml. of solution per cubic centimeter of resin per minute until the pH of the effluent from the column reaches 11.1 and remains constant at 11.1 for 10 minutes. The resin in said column is then washed with 20 volumes of distilled water per volume of resin, the rate of flow of the water being 5 ml. per cc. of resin per minute.

After the mixture of methyl ethyl ketone and water has been brought to the desired refluxing condition, as in Example I, the triethylamine is added gradually, over a period of 15 minutes, until the concentration of triethylamine in the liquid flowing to the bed of resin is 1.2% by weight. At the end of the 15 minute period, the addition of the mixture of formaldehyde and methyl ethyl ketone is begun. The concentration of triethylamine is maintained at 1.2% by weight throughout the run. The measured pH of the liquid leaving the bed of resin is 10.4. There is produced a mixture of isomers comprising about 94.2% of methyl isopropenyl ketone and 5.8% of ethyl vinyl ketone. It is found that one mole of triethylamine is used up for each 280 moles of these isomers produced. The extent of conversion to these isomers is 70.0% based on formaldehyde and 75.6% based on methyl ethyl ketone, while the efficiency of conversion to these isomers is 70.5% based on formaldehyde and 76.6% based on methyl ethyl ketone. The rate of production of these isomers is 0.0048 gram mole per milliliter of anion-exchange resin bed per hour.

Example III

The procedure of Example II is repeated except that the reaction is at first carried out with no addition of amine for a period of time until 0.06 gram mole of methyl isopropenyl ketone per ml. of resin bed have been produced. During this period the rate of production of methyl isopropenyl ketone and its isomer, ethyl vinyl ketone, drops from its original value of 0.0048 gram mole per ml. of resin bed per hour to 0.0017 gram mole per ml. of resin bed per hour. Thereafter triethylamine is added to the liquid flowing to the bed of resin at a rate sufficient to maintain the concentration of triethylamine in said liquid at 2.9% by weight. This results in an increase in the rate of production of methyl isopropenyl ketone and its isomer ethyl vinyl ketone until, after four hours of operation following the first addition of the triethylamine, the rate of production of methyl isopropenyl ketone and ethyl vinyl ketone is restored to its original value. On further operation in the presence of the triethylamine this rate of production is maintained.

*Example IV*

The procedure of Example I is repeated with the following exceptions:

The anion-exchange resin is prepared by rinsing the "Amberlite IRA-400" resin, which is in the chloride form, with a 5% aqueous sodium hydroxide solution until it is converted completely to the hydroxide form, and then washing the resin with 20 volumes of distilled water per volume of resin. The ratio of formaldehyde to methyl ethyl ketone in the feed mixture is 1.06:1. No amine is added to the reaction mixture. The ratio of methyl ethyl ketone to formaldehyde in the mixture flowing to the bed of resin varies from about 10:1 at the beginning of the reaction to more than 30:1 after the reaction has proceeded further. The rate of production of methyl isopropenyl ketone, and its isomer ethyl vinyl ketone, originally 0.0079 gram mole per ml. of anion-exchange resin bed per hour, decreases during operation, so that after three hours it is only 0.0021 gram mole per ml. of resin bed per hour and after eight hours the catalyst is completely deactivated, turning dark and imparting a red color to the reaction mixture. At the start of the run the measured pH of the liquid leaving the bed of resin is 10.6. This pH drops rapidly in the early stages of the reaction and reaches a value of 10.2 at the end of the run. The mixture leaving the reboiler of the aldol distillation column containing a high boiling oil insoluble therein. This oil steam distills in the second column and contaminates the methyl isopropenyl ketone.

*Example V*

Methyl ethyl ketone and formaldehyde are reacted to produce 4-hydroxy-3-methyl-butanone-2 in the absence of anion-exchange resin and in the presence of triethylamine. The reaction is carried out continuously in a distillation column packed with Berl saddles. Above the column there is a reflux condenser designed to return all of the condensate to the top of the column, while at the base of the column there is a reboiler provided with a continuous take-off side arm. At the start of the run, the reboiler is filled with water and heated to maintain a temperature of 100° C. therein. To the column there are added sufficient methyl ethyl ketone so that, when the column is at equilibrium and operating just below the flood point, the temperature of the column at a point midway up the column is 73.4° C., which is the boiling point of the azeotrope of methyl ethyl ketone and water. Aqueous formaldehyde (40% by weight) and methyl ethyl ketone are added to the reflux condensate, the rates of addition of these reactants being such as to maintain a molar ratio of methyl ethyl ketone to formaldehyde of 60:1 in the liquid flowing down to the top of the column. Triethylamine is added, before and during the addition of these reactants, at a rate sufficient to provide a concentration of 5.9% by weight of triethylamine in the liquid flowing down to the top of the column. A stream containing the monomethylol derivative, 4-hydroxy-3-methyl-butanone-2, otherwise known as 3-methylol-butanone-2, and the dimethylol derivative, 3,3-dimethylol-butanone-2, is recovered from the reboiler. The efficiency of conversion to 4-hydroxy-3-methyl-butanone-2 is 64%, based on the formaldehyde consumed, and 78% based on the methyl ethyl ketone consumed. The efficiency of conversion to the 3,3-dimethylol-butanone-2 is 6.5% based on the formaldehyde consumed and 4.0% based on the methyl ethyl ketone consumed.

*Example VI*

Example I is repeated, except that methyl isopropenyl ketone is substituted for the methyl ethyl ketone. Vinyl isopropenyl ketone is obtained in good yields.

*Example VII*

An autocondensation of butyraldehyde is carried out in an apparatus comprising a packed aldol distillation column, a catalyst container of the type shown in FIG. 2, a reflux condenser above the distillation column, and a thermosiphon reboiler at the base of said column. The catalyst container is provided with a bed of "Amberlite IRA-400" resin in the chloride salt form. At the beginning of the run, water is charged into the reboiler and caused to reflux in the system. Thereafter trimethylamine is added to the condensate flowing from the reflux condenser and refluxing is continued for a suitable period, e.g. 1 hour, in order to activate the resin, as in Example 1. Thereafter n-butyraldehyde is added continuously to the liquid flowing to the bed of resin. Together with the first portions of butyraldehyde there is added a proportion of methanol sufficient to provide a concentration of methanol in the liquid flowing to the resin bed of 10 to 12%. The butyraldehyde is added at a rate sufficient to maintain the temperature of the aldol distillation column, at a point one fourth of the distance down from the top thereof, at 74.5 to 75.5° C. Under these conditions the temperature in the bed of resin is 68.0 to 68.8° C. and the temperature in the reboiler is 100° C. Since the boiling points of the methanol, trimethylamine and butyraldehyde, and also of the n-butyraldehyde-water azeotrope, are less than the temperatures maintained in the distillation column, these materials are vaporized in the column, condensed and recycled to the bed of resin. The composition of the recycled material flowing to said bed is about 74 to 78% of n-butyraldehyde, 10 to 12% of methanol, 6 to 7% of water and about 6% of trimethylamine. During this run the rate of addition of the fresh butyraldehyde is about 0.0095 gram mole per ml. of resin bed per hour. The 2-ethyl-3-hydroxyhexanal produced by the aldol autocondensation of n-butyraldehyde passes down the distillation column to the reboiler. The reboiler, which is of the type having a constant level overflow, is maintained full of water during the process. The 2-ethyl-2-hydroxyhexanal is substantially immiscible with water and is less dense than water. Accordingly, the 2-ethyl-3-hydroxyhexanal passes out of the reboiler continuously, substantially as soon as it reaches said reboiler.

The stream of 2-ethyl-3-hydroxyhexanal leaving the reboiler is subjected to a dehydration reaction by charging it to a second thermosiphon reboiler located at the base of a second distillation column. This second reboiler is filled with an aqueous 5% solution of phosphoric acid and the 2-ethyl-3-hydroxyhexanal is added thereto at the rate of 0.072 gram thereof per hour per ml. of aqueous phosphoric acid in the second reboiler. The 2-ethyl-2-hexenal produced by the dehydration reaction passes up the second distillation column and distils over from the top of said column in the form of an aqueous azeotrope, comprising about 62.2% of water and 37.8% of 2-ethyl-2-hexenal, boiling at about 96 to 97° C. This azeotrope is condensed and the condensate is passed through a reflux divider which acts to direct a portion of the condensate to the top of the second distillation column as reflux and to direct the remainder of the condensate to a phase separator where the condensate is allowed to separate into two phases. The upper organic phase is collected as the product of the reaction while the aqueous phase is returned to the second distillation column at a point one fourth of the distance from the top of this column. The reflux divider is employed in order to insure that the temperature at the top of the second distillation column does not exceed the boiling point of the water-2-ethyl-hexenal azeotrope, thus preventing higher boiling materials from passing into the product.

For each mole of n-butyraldehyde fed to the system there are obtained 0.437 mole of 2-ethyl-2-hexenal, 0.021 mole of butyric acid and 0.045 mole of n-butyraldehyde. The latter two compounds result from decomposition taking place during the dehydration reaction. The anion-exchange resin retains its catalytic activity after many hours of use.

*Example VIII*

The autocondensation of acetaldehyde is carried out, in the presence of triethylamine and the absence of anion-exchange resin, in a reactor packed with Berl saddles and maintained under a pressure of 20 p.s.i.g. and at a temperature of 55 to 58° C. The reaction mixture is passed continuously to the top of a packed distillation column maintained at atmospheric pressure. Fresh liquid acetaldehyde is also supplied to the top of the column. The liquid at the base of the column is heated externally and also by the continuous injection therein of saturated steam (100° C.), which aids in stripping the unreacted acetaldehyde from the acetaldol. The vapors leaving the top of the column are condensed, mixed with 0.7% aqueous solution of triethylamine, and pumped continuously to the reactor. From the base of the column there is withdrawn continuously an aqueous solution of acetaldol. The rate of addition of the triethylamine solution is such as to maintain a pH of 10.2 to 10.4 in the mixture entering the reactor and the rate of addition of fresh acetaldehyde is such as to maintain such a concentration thereof in the column that the overhead temperature in the column is always 89° C. The rate of flow of reaction mixture through the reactor is such that the retention time in the reactor is 6 minutes. This rate of flow is maintained constant by regulating the rate of supply of steam to the base of the column, thus regulating the rate of distillation from the top of the column. Under these conditions the mixture flowing to the reactor comprises 60% by weight of water, about 0.1% by weight of triethylamine and the balance acetaldehyde, the conversion of acetaldehyde per pass through the reactor is 14%, and the amount of triethylamine fed is about 0.2 part by weight per 100 parts of fresh acetaldehyde fed.

The acetaldol-containing mixture withdrawn from the base of the column is subjected to dehydration by heating it in a second distillation column in the presence of 5% by weight of phosphoric acid. An azeotrope of crotonaldehyde and water is removed from the top of this second column.

For the entire process the yield of crotonaldehyde, based on acetaldehyde, is 94% and the efficiency of conversion is 94%.

*Example IX*

The autocondensation of butyraldehyde is carried out, in the presence of triethylamine and in the absence of anion-exchange resin, in a reactor packed with Berl saddles and maintained under a pressure of 30 p.s.i.g. and a temperature of 80 to 85° C. The reaction mixture is passed continuously upward through the reactor and is then fed continuously to the top of a packed distillation column maintained at atmospheric pressure. Fresh liquid butyraldehyde is also supplied to the top of the column. In the early stages of the process a quantity of methanol is added to the column; the methanol remains in the system. The vapors leaving the top of the column are condensed, mixed with a dilute aqueous solution of triethylamine, and pumped continuously to the reactor. The liquid leaving the base of the column passes through a phase separator, which is cooled by means of ice water. The water-insoluble phase, comprising 2-ethyl-3-hydroxyhexanal is removed continuously, while the aqueous phase is led to an externally heated thermosiphon steam generator or reboiler leading to the base of the column.

The rate of addition of triethylamine solution is such as to maintain the pH of the mixture flowing into the reactor at 11.3 to 11.4. The rate at which heat is supplied to the steam generator and the rate at which fresh butyraldehyde is added are such that the overhead temperature of the column is maintained at 80 to 81° C. and the residence time of the reaction mixture in the reactor is 9.5 minutes. Under these conditions the mixture flowing into the reactor contains 52.6% by weight of butyraldehyde, 23.2% by weight of methanol, 19.4% by weight of water and 4.7% by weight of triethylamine, the conversion of butyraldehyde per pass is 20%, and the amount of triethylamine supplied is less than one pound per 100 pounds of fresh butyraldehyde supplied.

The stream of 2-ethyl-3-hydroxyhexanal withdrawn from the phase separator is subjected to a dehydration reaction in a manner similar to that described in Example VII. 2-ethylhexenal is obtained at an efficiency of 92%, based on butyraldehyde.

The cooling of the phase separator, described above, reduces the solubility of the 2-ethyl-3-hydroxy-hexanal in the aqueous phase. Thus, the amount of this compound which passes with the aqueous phase to the heated portions of the aldol distillation system is decreased.

*Example X*

The condensation of methyl ethyl ketone and formaldehyde in the presence of triethylamine and in the absence of anion-exchange resin is carried out in a packed reactor maintained at a pressure of 45 p.s.i.g. and a temperature of 80° C. The reaction mixture is passed continuously through the reactor, then mixed continuously with a stream of liquid methyl ethyl ketone and fed to the top of a packed distillation column operating at atmospheric pressure and equipped with a reboiler. The vapors emerging from the top of this column are condensed and to the resulting stream of condensate there is added a stream of 30% aqueous formaldehyde, and then a sufficient amount of triethylamine to maintain the pH of the mixture at 10.8 to 11.0. The mixture is then pumped into the reactor. A stream of aqueous 4-hydroxy-3-methyl butanone is removed continuously from the reboiler.

The rates of addition of formaldehyde and methyl ethyl ketone and the rate of supply of heat to the reboiler are such that the overhead temperature of the column is 83° C., the molar ratio of methyl ethyl ketone to formaldehyde in the mixture flowing into the reactor is 30 to 1, and the residence time of the mixture in the reactor is 16 minutes. Under these conditions the mixture flowing into the reactor contains about 21% by weight of water, 1.0 to 1.5% by weight of formaldehyde, 76% by weight of methyl ethyl ketone and 2% by weight of triethylamine.

The 4-hydroxy-3-methyl butanone thus obtained is subjected to a dehydration reaction in a manner similar to that of Example I, to produce methyl isopropenyl ketone mixed with small amounts (less than 8%) of ethyl vinyl ketone and much smaller amounts of vinyl isopropenyl ketone. The degree of conversion of methyl ethyl ketone is 100% and the efficiency of its conversion to methyl isopropenyl ketone and ethyl vinyl ketone is 86.6%.

*Example XI*

Example X is repeated using acetone in place of methyl ethyl ketone. The pressure in the reactor is maintained at 60 p.s.i.g. and the temperature in the reactor is maintained at 84 to 86° C. The overhead temperature of the distillation column is 85° C. The mixture flowing into the reactor contains 30% water and 2.0% triethylamine, and the mole ratio of acetone to formaldehyde in this mixture is 38 to 1. The retention time in the reactor is 24 minutes. The resulting aldol product is 4-hydroxybutanone-2. On subjecting this product to a dehydration reaction methyl vinyl ketone is produced.

As stated, an important feature of this invention relates to the provision of a tertiary amine in the reaction mixture. This amine should be one which does not itself react under the prevailing conditions with the reactants undergoing the aldol condensation. Suitable amines are, for example, trialkyl amines, e.g. trimethylamine, dimethylethylamine, methyldiethylamine, triethylamine, or tripropylamine, other aliphatic amines such as N,N'-tetramethylethylenediamine, heterocyclic amines such as pyridine, N-methyl piperidine, N,N'-dimethyl piperazine, or N-methyl morpholine, and aromatic amines such as dimethylaniline. The more strongly basic amines are preferred, e.g. amines having an ionization constant of $10^{-5}$ or higher. The amine is preferably one which will evaporate and condense with at least one of the reactants. Advantageously the boiling point of the amine should be within about 20° C. of the temperature at which the more volatile reactant boils in the reaction mixture, and it is desirable that the amine form an azeotrope with the reactants. Thus, as shown in the specific examples, triethylamine, which boils at 89.4° C., is particularly suitable for use in a system containing formaldehyde, methyl ethyl ketone and water, since the methyl ethyl ketone, water and triethylamine form an azeotrope whose boiling point is 72.8° C., as compared with the boiling point of 73.4° C. for the two-component azeotrope of methyl ethyl ketone and water, although other amines such as trimethylamine, dimethylethylamine, diethylmethylamine, N,N'-tetramethylethylenediamine and N-methyl piperidine may be used, if desired. When the reactants are more volatile, more volatile amines should be employed. Thus in the condensation of formaldehyde and acetone, dimethylethylamine and diethylmethylamine are recommended.

While it is most desirable to employ the anion-exchange resin in conjunction with an amine in order to avoid deactivation during reaction, the anion-exchange resins may be used without the amine in the process of this invention. However, when the amine is not in contact with the anion-exchange resin during the reaction the catalytic activity of said resin will tend to decrease as the reaction progresses, so that steady state conditions will not be maintained. Accordingly, in the absence of the amine, provision may be made for continuously supplying freshly activated resin to the bed of resin in contact with the reactants and for continuously removing partially deactivated resin from said bed. Alternatively, instead of one catalyst bed there may be provided two or more catalyst beds so arranged that one is connected to the condenser and to the distillation column while the other is being activated or or reactivated. When the first bed of catalyst becomes partially deactivated, it is disconnected from the condenser and distillation column, and the other, activated, bed is connected in its place. In this modification, reactivation of the bed of partially deactivated catalyst may be carried out by treating said bed with an aqueous solution containing a relatively weak base, such as ammonia, or an amine, e.g. triethylamine, or other primary, secondary or tetriary amines, or a basic salt of a weak acid, e.g. an alkali metal salt of carbonic acid or, less desirably, with an aqueous solution of a strong base, such as sodium hydroxide. In order to enhance the stability of the anion-exchange resin so that said resin will be easily reactivated and have a longer catalyst life, it is desirable to carry out the activation of said resin to only a limited extent so that said resin contains more ammonium salt groups, e.g. quaternary ammonium halide or sulfate groups, than ammonium hydroxide groups. Thus, in the case of "Amberlite IRA-400" the chloride form of this anion-exchange resin may be treated with an alkaline material to exchange only about 6 to 8% of the chloride groups for hydroxyl groups, to produce a material whose capacity for neutralizing a strong acid is about 0.05 to 0.07 milliequivalent per milliliter.

In the preferred procedure, in which anion-exchange resin is used in conjunction with an amine, the amount of amine present in the solution may be varied widely. For example, good results have been obtained in the process of Example I above when the concentration of triethylamine has been varied over the range from 0.6 to 9.3% by weight, causing a corresponding variation in the measured pH of the liquid leaving the bed of anion-exchange resin of 9.5 to 11.2, although the optimum results in this particular process are obtained when the concentration of the triethylamine is about 1 to 2% by weight.

The proportions of the reactants employed in the process may also be varied. When formaldehyde is one of the reactants it is generally desirable to employ a molar deficiency of formaldehyde in order to insure maximum yields of monomethylol compounds. The compound reactive with the formaldehyde, e.g. the ketone containing an alpha hydrogen, such as methyl ethyl ketone or methyl isopropenyl ketone, will accordingly be employed in molar excess, there being preferably at least 10 moles of said compound present per mole of formaldehyde. Thus, in the reaction of formaldehyde and methyl ethyl ketone best results are obtained when the reaction mixture flowing to the reaction zone, e.g. to the bed of anion-exchange resin, contains at least 15 moles, preferably about 30 or more moles of methyl ethyl ketone, for each mole of formaldehyde.

The process of this invention is particularly useful for the production of these aldol condensation products which are formed by the reaction of two molecules of the reactants, e.g. the monomethylol product 4-hydroxy-3-methyl butanone-2 formed by the reaction of one molecule of formaldehyde and one molecule of methyl ethyl ketone, the acetaldol formed by the reaction of two molecules of acetaldehyde and the 2-ethyl-3-hydroxyhexanal formed by the reaction of two molecules of n-butyraldehyde. The production of high yields of such products is promoted by the relatively rapid removal thereof from the zone of reaction and from the reactants and the amine, which removal is assisted by rectification in the aldol distillation column. The rectification procedure, as carried out according to the present invention, has the further advantage of providing a relatively pure reaction product substantially free from the reactants and thus eliminates the necessity for a later, separate, stripping operation to remove the reactants from the product.

The residence time of the reactants in the reaction zone, e.g. in the bed of resin, is advantageously relatively short and the conversion per pass through the reaction zone is relatively low. Thus, in Examples I to IV above this residence time is in the range of 20 to 100 seconds. In the triethylamine-catalyzed autocondensation of acetaldehyde to produce acetaldol conversions per pass of less than about 25%, e.g. 13 to 22%, are very suitable.

In carrying out the aldol condensation and the separation of the condensation product from the reactants, it is desirable to prevent said condensation product from decomposing. To this end there should be present in the distillation zone used for this separation, i.e. the aldol distillation zone, a liquid having a boiling point below that of said condensation product. Preferably this liquid is one which, under the prevailing distillation conditions, is present in the hotter portions of the aldol distillation zone and does not appear in unduly high concentration (preferably below about 20% when the anion-exchange resin containing quaternary ammonium groups is used) in the reaction zone. Thus, the presence of the added liquid prevents the temperature of the condensation product in the distillation column or in the reboiler of said column from rising too high and causing decomposition of the product. As shown in the above examples, water is a very suitable liquid for this purpose, though there may be employed other appropriate liquids which are substantially inert under the prevailing conditions and which preferably have higher boiling points than the reactant being vaporized in the aldol distillation column. Thus propanol is another suitable liquid.

Additionally, in order to prevent the decomposition of the aldol condensation product, it is desirable to remove said condensation product relatively rapidly from the lower portion of the aldol distillation zone. For example, the residence time of the aldol condensation product in the reboiler at the base of the aldol distillation zone is advantageously not above one hour, preferably not above 30 minutes.

One effect of too long a residence time at the base of the aldol distillation zone is the dehydration of the aldol condensation product to form an unsaturated compound, which is more volatile than said aldol condensation product and therefore tends to migrate up said aldol distillation zone. This is frequently undesirable in aldol condensation reactions involving formaldehyde. Thus when formaldehyde is reacted with methyl ethyl ketone to produce 4-hydroxy-3-methyl butanone-2 and the latter compound is kept in the reboiler at the base of the aldol distillation zone for too long a period, the methyl isopropenyl ketone formed by dehydration in said reboiler tends to migrate up the aldol distillation zone and to become concentrated at the top of the system so that it circulates through the reaction zone and reacts with the formaldehyde to form a monomethylol methyl isopropenyl ketone, which contaminates the desired 4-hydroxy-3-methyl butanone-2. Accordingly, when the resulting impure 4-hydroxy-3-methyl butanone-2 is mixed with an acidic dehydration catalyst and subjected to dehydration reaction conditions, there is produced not only the desired methyl isopropenyl ketone but also the dehydration product of said monomethylol methyl isopropenyl ketone, namely vinyl isopropenyl ketone, which is difficult to separate from the methyl isopropenyl ketone.

In carrying out the aldol condensation in the presence of the anion-exchange resin, it is desirable that the liquid reaction mixture in contact with said resin be homogeneous. If this reaction mixture is not homogeneous, i.e. if phase separation occurs, it is found that there is poor and uneven contact between the resin and the reactants, the rate of reaction is reduced, and channeling and bumping occurs in the bed of resin. Homogeneity is also desirable even when the anion-exchange resin is not used. In accordance with one aspect of this invention, any tendency towards phase separation is overcome by incorporating into the liquid reaction mixture a volatile solvent miscible with both phases. The solvent is of such volatility in the mixture that it evaporates in the aldol distillation column together with the reactants and is condensed in the reflux condenser. Thus, this solvent tends to be concentrated in the upper portion of the system and substantially none of it passes down the aldol distillation column. Accordingly, once the desired amount of this solvent is added to the system substantially no further amounts need be added throughout the operation of the continuous process. For example, in the aldol condensation of butyraldehyde in the presence of water the tendency of the butyraldehyde and water phases of the reaction mixture to separate may be overcome by the addition of a suitable amount of methanol at the beginning of the operation of the process. Dioxan is another suitable inert solvent for this purpose.

However, when the process of this invention is used for aldol condensations involving formaldehyde, it is preferable to avoid using the common form of formaldehyde which has been stabilized with methanol. Since methanol is highly volatile it tends to concentrate in the upper portion of the system, i.e. it volatilizes in the distillation column used for separating the reactants from the aldol condensation product, and then condenses and passes together with the reactants through the reaction zone. The methanol is substantially inert under the conditions prevailing in the upper part of the system, and it is therefore not removed therefrom. Accordingly, if a methanol-containing material is added continuously, the concentration of methanol in the upper part of the system increases continuously and undesirably. The same considerations apply equally to the continuous addition of other relatively inert materials which are highly volatile under the conditions prevailing in the distillation column.

The fresh reactants may be supplied to the reaction zone by adding them to the condensate flowing to said reaction zone or they may be supplied to the system at some other suitable point. For example, they may be added at the top of the distillation column used for separating the unreacted reactants from the aldol condensation product, or they may be added, in the liquid or gaseous state, to the vapors flowing from said column to the reflux condenser, or one of the reactants may be added at one of the above-mentioned points while the other reactant or reactants may be added at another of said points.

As shown in Examples V and VIII to XI above, the process of this invention can be carried out using a volatile tertiary amine as the sole catalyst for the reaction. However, it is found that generally the rate of reaction, at the same reaction temperature, is greatly increased when the volatile amine is used in combination with the anion-exchange resin. While we do not wish to be bound by any theory, this effect appears to be due to the fact that the excess of the amine passing repeatedly over the resin gradually causes the replacement by mass action of a portion of the acid-forming anions, e.g. the chloride ions, of said resin by hydroxyl ions. The resulting activated resin, containing some quaternary ammonium hydroxide groups, as well as a larger number of quaternary ammonium salt groups, is more highly basic and more active as a catalyst than the amine.

When the amine is used as the sole catalyst it is desirable to provide a zone, maintained at an elevated reaction temperature, wherein the liquid condensate from the reflux condenser is retained before it is returned to the distillation column. For this purpose the apparatus illustrated in the drawings is very suitable. For example, the closed tube 18 (FIG. 2) acts to retain the liquid reaction mixture, comprising the condensate from the reflux condenser together with any added reactant or reactants, before said reaction mixture flows to the distillation column 11. It will be understood, of course, that in this case no bed of anion-exchange resin 19 is present in the tube 18. Instead of the tube shown in FIG. 2 a separate reactor, such as a reactor packed with suitable material, e.g. Berl saddles, may be used.

In the presence of the amine and in the absence of the resin containing strongly basic quaternary ammonium groups, a considerable increase in the rate of reaction may be attained by an increase in the reaction temperature and also, preferably, by an increase in the proportion of water present in the reaction mixture. Thus, as shown in Examples VIII to XI above, the reaction may be carried out at temperatures above the atmospheric boiling point of the more volatile constituents of the reaction mixture, for example at temperatures above 80° C., while maintaining the reaction mixture in the liquid state by the use of superatmospheric pressures. In many cases the proportion of water necessary to obtain optimum reaction rates is greater than the proportion of water present in the distillate which would come over from the top of the aldol distillation column under equilibrium refluxing conditions. In such cases an increase in the proportion of water may be obtained by increasing the distillation temperature to a point where the water concentration in the vapors flashed from the aldol distillation column is at the desired level, all the overhead vapors being condensed and passed through the reactor before they are returned to the top of the column. For example, when the aldol distillation column is operated under equilibrium refluxing conditions the distillate from a mixture of formaldehyde, methyl ethyl ketone, triethylamine and water is an azeotrope of methyl ethyl ketone, water and triethylamine, boiling at 72.8° C. and containing about 12% of water. However, when, as in Example X above, the aldol distillation column is operated at an overhead temperature of 83° C., the water content of the distillate is about 21%. Similar procedures are employed in Examples VIII, IX and XI. The increased proportion of water may also be supplied, less advantageously, in other ways, as by the addition of water to the condensed vapors flowing to the reactor. Preferably at least about 20% of water is present in the reaction mixture and the reaction temperature is maintained at at least about 80° C., preferably about 80 to 90° C., when the anion-exchange resin is omitted.

As stated, the condensation product leaving the base of the aldol distillation column may be subjected to a continuous dehydration reaction in the presence of a catalyst in a second distillation column to produce an unsaturated compound, such as methyl isopropenyl ketone. For this purpose phosphoric acid is the preferred catalyst, but other catalysts, such as iodine, zinc chloride, oxalic acid, potassium acid sulfate, sulfuric acid, hydrochloric acid or p-toluene sulfonic acid, may be employed, if desired.

Advantageously the dehydration reaction is carried out in the presence of a water solution of the acidic dehydration catalyst. Certain aldol condensation products are miscible to only a minor extent with such aqueous acid. Thus, the aldol condensation product of butyraldehyde is soluble to the extent of less than 1% in water and forms a separate phase when mixed in greater amounts with the aqueous acid. It is found that the dehydration of such aldol condensation products can be carried out much more efficiently, with better yields of the desired unsaturated compounds, when the concentration of the aldol condensation products in the aqueous acid is reduced. Thus, for best results the concentration of such aldol condensation products in the mixture thereof with the aqueous acid is so low that the aldol condensation products are completely miscible with said aqueous acid. One convenient method of carrying out such a reaction is described in Example VII above in which a stream of the aldol condensation product is added continuously to aqueous phosphoric acid at such a slow rate that the solubility of said aldol condensation product in the aqueous acid is not exceeded, and the unsaturated compound produced by dehydration is distilled off continuously.

Superatmospheric pressures or subatmospheric pressures may be employed at any or all stages of the process, as desired. Thus as pointed out above, the temperature and, accordingly, the reaction rate may be increased by employing superatmospheric pressures for the aldol condensation reaction. For example the liquid reaction mixture passing to the bed of anion-exchange resin may be placed under superatmospheric pressure and the pressure of said liquid mixture may be reduced to atmospheric when it passes from said bed to the distillation zone. Also, the pressure may be reduced below atmospheric to lower the temperature in the zone where the dehydration reaction is taking place or may be increased to raise the temperature in said dehydration zone.

The present invention provides a process whereby the condensation is carried out easily and economically, the reactants are utilized more efficiently, the desired products are obtained in improved yields and at a higher rate of production than is possible with equipment of the same size using the processes of the prior art. Furthermore, the desired products are obtained directly in a form free of catalyst and substantially free of reactants, and the catalyst is regenerated in situ during the reaction so that the catalyst has a very long effective life.

In addition, the present invention provides a process whereby anion-exchange resins may be used as catalysts in a novel manner and may be employed at temperatures far above the temperatures believed to be safe operating limits of the resin. Thus, although it has been previously suggested that anion-exchange resins be used as catalysts for alkaline-catalyzed organic reactions, it has heretofore been thought necessary in such uses to employ the resin in the hydroxyl form produced by treating the resin containing quaternary ammonium chloride groups with sodium hydroxide, and to carry out the reaction at temperatures below 55 to 60° C., as will appear from the publication "Laboratory Manual Amberlite IRA-400," issued by Rohm & Haas Company, the manufacturers of "Amberlite IRA-400." The present invention makes it possible to use such anion-exchange resins at temperatures above 60° C., e.g. at the temperature of about 72 to 74° C. in the preceding specific examples, for carrying out condensation reactions for long periods of time without impairing the activity of the resins.

It is to be understood that the foregoing detailed description is given merely by way of illustration and that many variations may be made therein without departing from the spirit of our invention.

Having described our invention, what we desire to secure by Letters Patent is:

1. In a process for carrying out an aldol condensation of organic reactants comprising an aldehyde and a member of the group consisting of aldehydes and ketones, said reactants being reactive with each other under basic conditions to produce an aldol condensation product, the improvement which comprises passing said reactants and a tertiary amine continuously over a body of a basic anion-exchange resin containing quaternary ammonium groups and recovering the resulting aldol condensation product, said amine serving to maintain the catalytic activity of said resin.

2. Process as set forth in claim 1 in which said tertiary amine has an ionization constant of at least about $10^{-5}$.

3. Process as set forth in claim 1 in which said tertiary amine is volatile, said amine is separated from said aldol condensation product by evaporation and the evaporated amine in then condensed and passed over said body of resin together with further quantities of said reactants.

4. In a process for carrying out an aldol condensation of reactants comprising an aldehyde and a member of the group consisting of aldehydes and ketones, the improvement which comprises bringing said reactants into contact with a body of a basic anion-exchange resin which contains quaternary ammonium hydroxide and quaternary ammonium salt groups, the number of said quaternary ammonium salt groups being greater than the number of said quaternary ammonium hydroxide groups, to effect a reaction between said reactants and to produce a reacted mixture containing at least one unreacted reactant and an aldol condensation product of said reactants, continuously separating said reacted mixture from said body of resin, continuously rectifying said separated reacted mixture in a distillation zone to produce vapors comprising said unreacted reactant and a residue comprising said aldol reaction product, continuously recycling said unreacted reactant by continuously liquefying said vapors and continuously bringing said liquefied vapors into contact with said body of basic anion-exchange resin, and continuously feeding further quantities of said reactants into admixture with said recycling unreacted reactant, and continuously reactivating said resin during said process by passing a tertiary amine in admixture with said recycling reactant continuously over said basic ion-exchange resin.

5. Process as set forth in claim 4 in which said amine is volatile and in which said amine is continuously recycled by vaporizing and liquefying said amine together with said unreacted reactant.

6. Process as set forth in claim 4 in which said amine has an ionization constant of at least about $10^{-5}$.

7. In a process for the aldol condensation of formaldehyde and a liquid organic compound reactive therewith selected from the group consisting of aldehyde and ketones to produce a monomethylol derivative of said compound, said compound containing an activated hydrogen atom attached to a carbon atom, the improvement which comprises introducing said organic compound into a distillation column, supplying heat to the bottom portion of said column to produce vapors comprising said organic compound, passing the evolved vapors upward through said column, liquefying the vapors arising from said column, passing a liquid reaction mixture comprising the liquefied vapors of said organic compound together with formaldehyde through a bed of a basic anion-exchange resin, there being in said liquid mixture more than one mole of said organic compound per mole of formaldehyde, while maintaining said liquid mixture at a temperature to cause said organic compound to react with said formaldehyde to form a monomethylol derivative of said organic compound, separating the resulting reacted mixture from said bed and passing the resulting reacted mixture downwardly through said column countercurrent to the upwardly flowing vapors comprising said organic compound, rectifying said reacted mixture in said column to provide a progressively higher concentration of said monomethylol derivative downwardly through the column, and withdrawing said monomethylol derivative from the bottom of said column, said resin containing quaternary ammonium hydroxide and quaternary ammonium salt groups, said hydroxide groups being about 6 to 8% of the total number of quaternary ammonium groups so that the capacity of said resin to neutralize a strong acid is about 0.05 to 0.07 milliequivalent per milliliter.

8. Process as set forth in claim 7 in which there is present in said column an inert liquid which is more volatile than said monomethylol derivative and less volatile than said organic compound whereby said inert liquid is present in the bottom portion of the column and acts to reduce the temperature in said bottom portion.

9. In a process for the aldol condensation of formaldehyde and a liquid organic compound reactive therewith selected from the group consisting of aldehydes and ketones to produce a monomethylol derivative of said compound, said compound containing an activated hydrogen atom attached to a carbon atom, the improvement which comprises introducing said organic compound and a volatile tertiary amine into a distillation column, supplying heat to the bottom portion of said column to produce vapors comprising said organic compound and amine, passing the evolved vapors upward through said column, liquefying the vapors arising from said column, passing a liquid reaction mixture comprising the liquefied vapors of said organic compound and amine together with formaldehyde through a bed of a basic anion-exchange resin, there being in said liquid mixture more than one mole of said organic compound per mole of formaldehyde, while maintaining said liquid mixture at a temperature to cause said organic compound to react with said formaldehyde to form a monomethylol derivative of said organic compound, separating the resulting reacted mixture from said bed and passing the resulting reacted mixture downwardly through said column countercurrent to the upwardly flowing vapors comprising said organic compound, rectifying said reacted mixture in said column to provide a progressively higher concentration of said monomethylol derivative downwardly through the column, and withdrawing said monomethylol derivative from the bottom of said column.

10. Process as set forth in claim 9 in which said organic compound is methyl ethyl ketone.

11. Process is set forth in claim 9 in which said organic compound is methyl isopropenyl ketone.

12. In a process for the aldol autocondensation of an aldehyde having at least two carbon atoms, the process which comprises introducing said aldehyde into a distillation zone, supplying heat to the bottom portion of said zone to produce vapors comprising said aldehyde, passing the evolved vapors upward through said distillation zone, liquefying the vapors arising from said distillation zone, passing a liquid reaction mixture comprising said liquefied vapors through a bed of a basic anion-exchange resin while maintaining said liquid reaction mixture at a temperature to cause autocondensation of said aldehyde to form a condensation product of two molecules of said aldehyde, separating the resulting reacted mixture from said bed and passing the resulting reacted mixture downwardly through said distillation zone countercurrent to the upwardly flowing vapors comprising said aldehyde, rectifying said reacted mixture in said distillation zone to provide a progressively higher concentration of said condensation product downwardly through said zone, and withdrawing said condensation product from the bottom portion of said distillation zone said resin containing quaternary ammonium hydroxide and quaternary ammonium salt groups, said hydroxide groups being about 6 to 8% of the total number of quaternary ammonium groups so that the capacity of said resin to neutralize a strong acid is about 0.05 to 0.07 milliequivalent per milliliter.

13. In a process for the aldol autocondensation of an aldehyde having at least two carbon atoms, the process which comprises introducing said aldehyde and a volatile tertiary amine into a distillation zone, supplying heat to the bottom portion of said zone to produce vapors comprising said aldehyde and amine, passing the evolved vapors upward through said distillation zone, liquefying the vapor arising from said distillation zone, passing a liquid reaction mixture comprising said liquefied vapors of said aldehyde and amine through a bed of a basic anion-exchange resin while maintaining said liquid reaction mixture at a temperature to cause autocondensation of said aldehyde to form a condensation product of two molecules of said aldehyde, passing the resulting reacted mixture downwardly through said distillation zone countercurrent to the upwardly flowing vapors comprising said aldehyde and amine, rectifying said reacted mixture in said distillation zone to provide a progressively higher concentration of said condensation product downwardly through said zone, and withdrawing said condensation product from the bottom portion of said distillation zone.

14. Process as set forth in claim 13 in which said aldehyde is butyraldehyde.

15. Process as set forth in claim 13 in which there is present in said distillation zone an inert liquid which is more volatile than said condensation product and less volatile than said aldehyde whereby said inert liquid is present in the bottom portion of said zone and acts to reduce the temperature in said bottom portion.

16. Process as set forth in claim 15 in which said inert liquid is immiscible with said aldehyde.

17. Process as set forth in claim 16 in which there is present in said liquid reaction mixture a second inert organic liquid, which second inert liquid is more volatile than said first mentioned inert liquid and evaporates with and condenses with said aldehyde and said amine, said second liquid being miscible with said first inert liquid and with said aldehyde and being present in an amount sufficient to cause said liquid reaction mixture to be homogeneous.

18. Process as set forth in claim 17 in which said aldehyde is butyraldehyde, said first inert liquid is water and said second inert liquid is methanol.

19. In a process for carrying out an aldol condensation of reactants comprising formaldehyde and a ketone reactive therewith to produce a monomethylol compound of said ketone, the improvement which comprises passing a mixture comprising a volatile tertiary amine, formaldehyde and at least 10 moles of said ketone per mole of formaldehyde through a bed of an anion-exchange resin containing quaternary ammonium groups to effect a reaction between said reactants and to produce a reacted mixture comprising said amine, unreacted reactants and said monomethylol compound, continuously separating said reacted mixture from said bed, continuously rectifying said separated reacted mixture in a distillation column to produce vapors comprising said amine and said unreacted reactants and a residue comprising said monomethylol compound, continuously recycling said amine and said unreacted reactants by continuously liquefying said vapors and continuously passing said liquefied vapors through said bed of basic anion-exchange resin, continuously feeding further quantities of said reactants into admixture with said recycling amine and unreacted reactants, continuously determining the content of said ketone in said column at a predetermined intermediate point on said column, and varying the relative ratios of said reactants in said further quantities in response to variations in said ketone content.

20. Process as set forth in claim 19 in which said ketone content is determined by measurement of the temperature at said predetermined point.

References Cited in the file of this patent

UNITED STATES PATENTS

| | | |
|---|---|---|
| 1,913,159 | Guinot | June 6, 1933 |
| 2,130,592 | McAllister et al. | Sept. 20, 1938 |
| 2,139,360 | Fairbairn et al. | Dec. 6, 1938 |
| 2,239,232 | Huyser | Apr. 22, 1941 |
| 2,309,650 | McAllister et al. | Feb. 2, 1943 |
| 2,380,828 | Dreisbach et al. | July 31, 1945 |
| 2,395,414 | Lincoln et al. | Feb. 26, 1946 |
| 2,468,710 | Hull | Apr. 26, 1949 |
| 2,510,914 | Spurlin et al. | June 6, 1950 |

OTHER REFERENCES

Astle et al.: Ind. & Eng. Chem., vol. 44, pp. 2869–2871 (1952).